Figure 1:
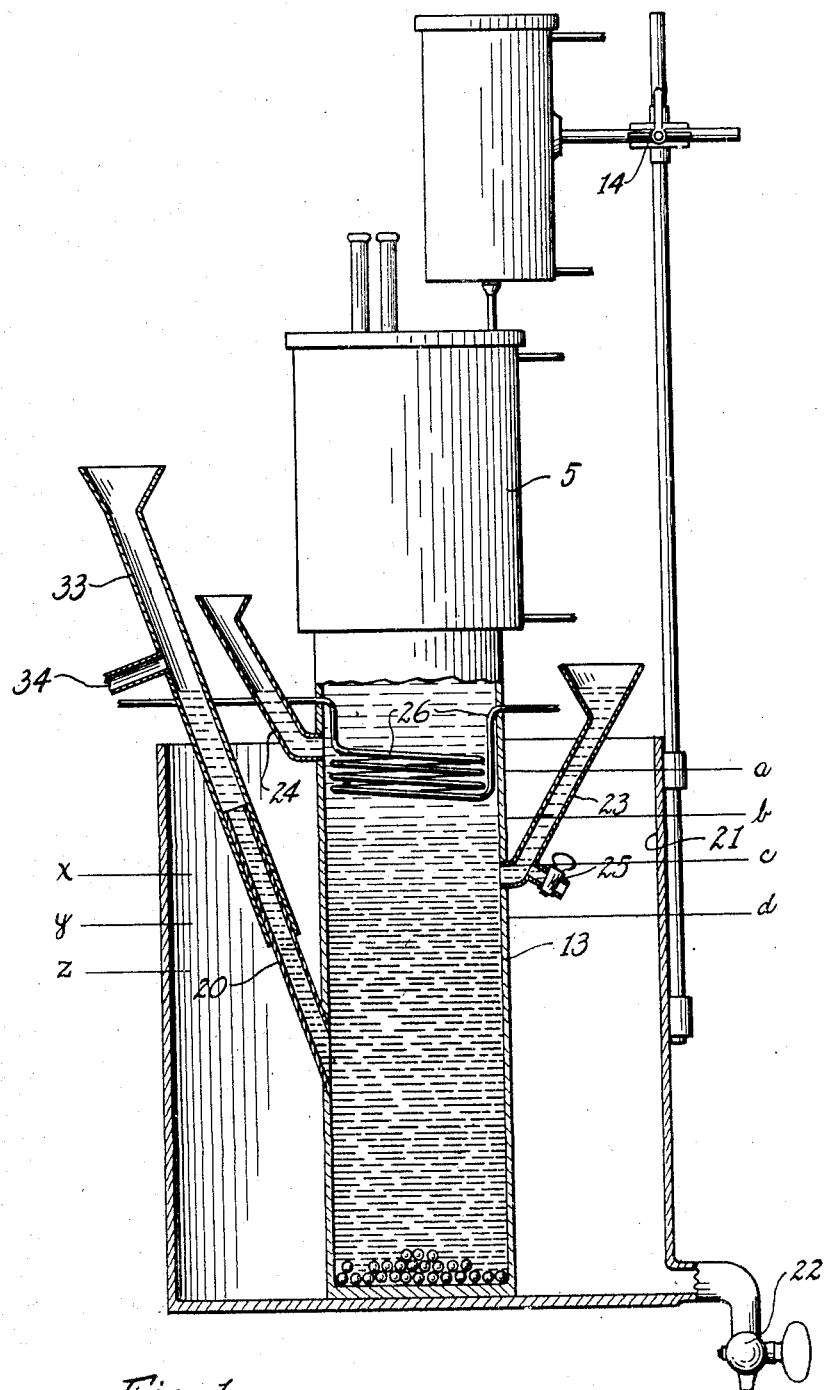

June 10, 1930.  C. E. LINEBARGER  1,762,693
METHOD AND APPARATUS FOR MAKING PELLETS
Filed Jan. 5, 1927   2 Sheets-Sheet 1

INVENTOR:
Charles E. Linebarger
By E. J. Andrews
Atty.

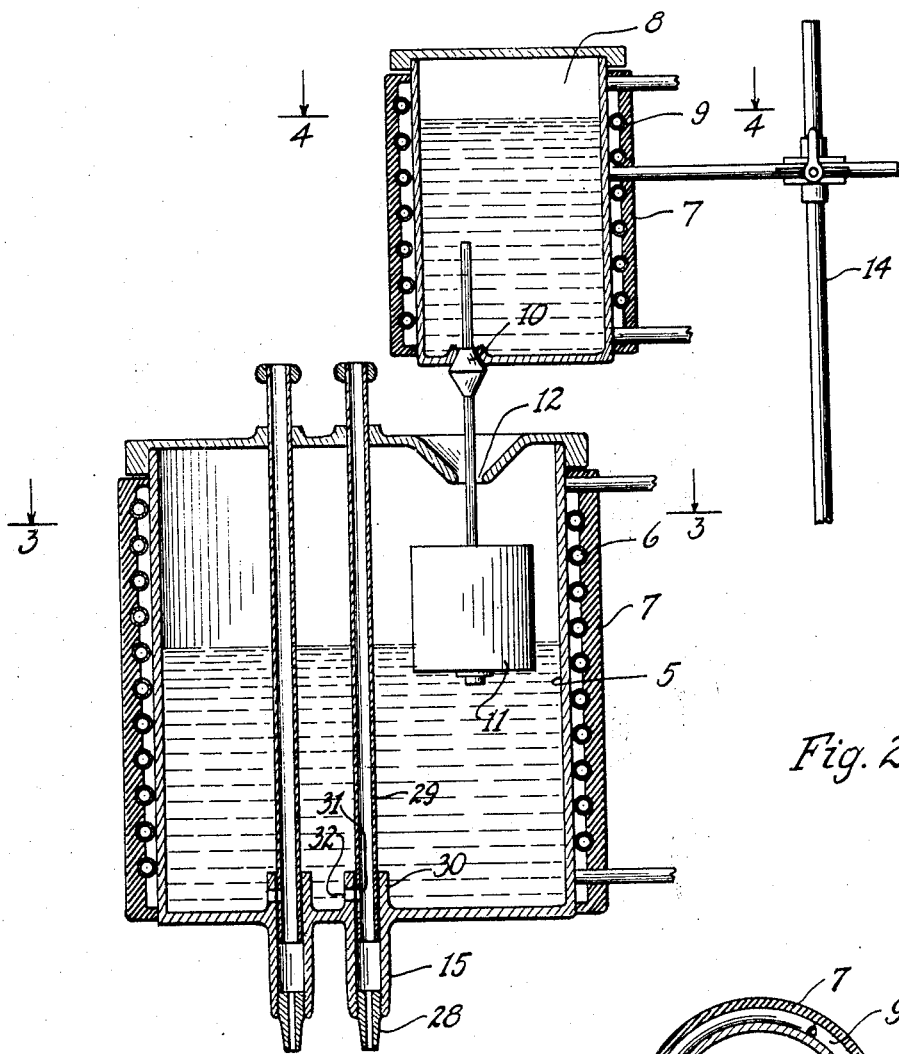
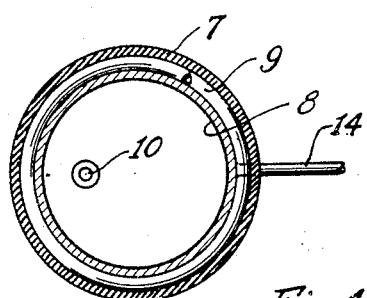
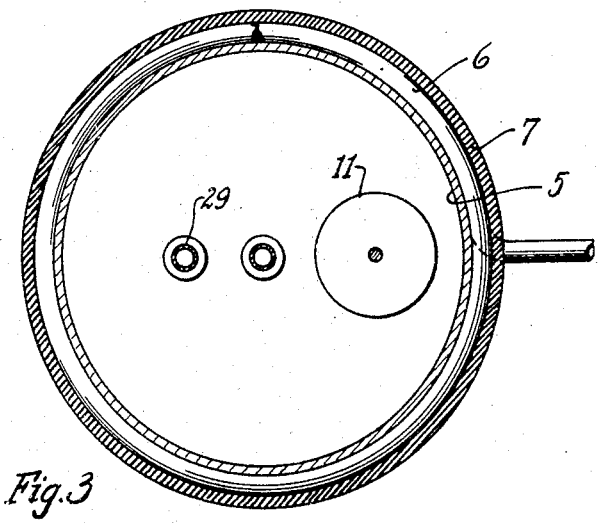
Fig. 2
Fig. 4
Fig. 3
INVENTOR:
Charles E. Linebarger
By E. J. Andrews
Atty.

Patented June 10, 1930

1,762,693

UNITED STATES PATENT OFFICE

CHARLES E. LINEBARGER, OF CHICAGO, ILLINOIS

METHOD AND APPARATUS FOR MAKING PELLETS

Application filed January 5, 1927. Serial No. 159,227.

This invention relates to methods and apparatus for making small balls, or pellets, or pieces of substances, and has for its object an improved method for making such articles rapidly and of uniform size and shape and material, and for providing apparatus by means of which the size or shape or density of the articles can be varied to suit the requirements. In general the method and apparatus is for the purpose of taking large amounts of substances which melt at fairly low temperatures when it is desired to separate the mass of the substances into a large number of small pieces, ordinarily of some special shape, and making the articles not only homogenous throughout but of shape and density similar to all of the others which are made by the same method and adjustment of the apparatus.

Of the accompanying drawings Fig. 1 is an elevation partly in section of apparatus which may be used in carrying out my invention; Fig. 2 is a sectional elevation of the upper portion of the apparatus; Fig. 3 is a transverse sectional view along the line 3—3 of Fig. 2; and Fig. 4 is a transverse sectional view along the line 4—4 of Fig. 2.

It is well understood, that, when a substance is melted and allowed to drop freely from an orifice, all of the drops will tend to become spherical and uniform in size, and will be so if the drops continue to fall until they harden. I have found, however, that the exact shape of the pellets can be varied by bringing certain influences to bear on them during the hardening process. In general my method consists in allowing the particles to drop through a liquid instead of through the air, and to control the density and temperature and depth of the liquid according to the requirements in producing pellets of various sizes and shapes.

Any suitable liquid can be used for the purpose. I prefer, however, to use a liquid which has more or less of some substance in solution so that the density of the liquid can be controlled by the concentration of the solution as well as by the temperature of the liquid. I prefer to use an electrolyte; that is, any liquid which has any acid, base or salt in solution. Various salt solutions may be used, depending upon the particular needs, and bearing in mind the necessity of using a liquid which has no material effect on the substance which is being operated on. For the particular purpose which I use to illustrate my invention I prefer to use a solution of calcium chloride.

My invention is applicable to the production of pellets, or small masses, ordinarily of organic substance with perhaps more or less inorganic substances as a part of the mixture, and for the illustration of my invention I will describe it as applicable to the manufacturing of hydrometric units, which are known by the trade as "Chaslyn balls". But it is to be understood that this is merely an illustrative embodiment of the invention. Also, I use the term balls for convenience merely in describing the invention and not to imply sphericity, or any particular shape of the articles which are produced.

In making the balls I provide an apparatus for melting the substance from which the ball is to be made, such as the reservoir 5, which is heated by any suitable means, such as by means of steam or hot liquid passing through a coil 6 of piping which surrounds the reservoir and which is preferably mounted under insulation 7. Any suitable means may be used for passing the liquid or steam through this coil.

The substance from which the balls are to be made is inserted in the reservoir 5 in any suitable manner. As it is desirable to be able to adjust and maintain constant the level of the liquid in the reservoir 5 which results from melting the substance, I provide for this purpose another reservoir 8 in which the substance to be melted is inserted and heated by means of steam or hot liquid passing through a coil 9 which surrounds this reservoir. In the bottom of the reservoir is a valve 10 which is operated by means of a float 11 in the reservoir 5. By means of this apparatus, when the liquid level in the reservoir 5 sinks sufficiently, the valve will open and the liquid in the reservoir 8 will flow through the valve 10 and the aperture 12 into the reservoir 5, thus restoring the liquid level in this reservoir to the elevation desired. In this manner the pressure on the orifices, from which the liquid in the reservoir 5 flows into the tank 13, may be adjusted. This adjustment is provided for in any suitable manner such as by adjustably supporting the reservoir 8 on a standard 14 or in any other suitable manner. By elevating the reservoir 8 a certain amount the valve 10 will necessarily rise the same distance before closing and this will allow the liquid level in the reservoir 5 to rise a similar distance.

Beneath the reservoir 5 the tank 13 is located for receiving the melted substance and forming the balls. The liquid is passed into the tank by means of orifices 15 in the bottom of the reservoir 5. In the tank 13 a liquid is placed, and means are provided for varying the temperature and density of this liquid according to the needs. In general the liquid in the upper end of the tank into which the orifices 15 project is maintained at substantially the same temperature as the liquid from which the drops are being formed. Beneath this layer of liquid, however, in the upper end of the tank, a layer of liquid is maintained at a lower temperature, ordinarily in the neighborhood of the temperature of the melting temperature of the substance being operated on. While in the lower portion of the tank the temperature of the liquid is maintained below the melting point of the liquid. By this arrangement the melted substance passes into the tank without any material change in temperature so that the drops form freely, and the temperature of the intermediate layer of liquid is reduced so as to cool somewhat the drops without setting the substance, and ultimately the temperature is such as to harden the drops sufficiently to prevent distortion of the shape before they reach the bottom of the tank. A part of the process, however, is to provide a liquid for the various layers of suitable density, and hence buoyancy, to retard the downward movement of the drops sufficiently to allow the surface tension to be sufficiently effective in shaping them before the cold layer of liquid is reached. It will be understood that the density of the liquid depends on the temperature as well as on the concentration of the solution, so that the buoyancy can be varied without materially varying the temperatures by merely varying the concentration of the solution.

A further desirable result gained by properly adjusting the temperature and density of the intermediate layer of liquid is that the balls may be made to move up and down slightly on arriving at a certain position with respect to the intermediate and lower layers. This up and down motion causes the removal of air dissolved in the melted substance of which the balls are composed. By compelling the drops to remain for a short time within the zone of liquid just above the cold layer, the solidification takes place slowly enough for any dissolved gases to rise and escape from the balls as bubbles. This procedure precludes the presence of air bubbles confined in the balls and insures uniformity in the density of the balls; for the presence of confined air may render the balls lighter.

While the exact details in carrying out the method depends materially on the substance which is being operated on, yet, in general, the method is to maintain the liquid in the upper portion of the tank above the melting point of the substance and the temperature of the intermediate liquid substantially at the melting point of the substance and the temperature of the liquid in the lower portion of the tank below the melting point. However, these various temperatures may be varied relatively to each other and to the melting point of the substance in order to vary the shape and also the size of the balls. For instance, when the temperature at which the drops solidify is above a certain critical value each ball will have more or less of a cavity in its upper side and when the temperature is below this critical point the balls will have extrusions on the upper sides. But both of these effects may be overcome by maintaining the temperature of the liquid which surrounds the drops at substantially a certain critical value. Also, if the lower liquid is too cold so that the entire ball solidifies too rapidly the ball will be flattened on top with a projection extending upwardly therefrom.

It should also be understood that these effects are varied more or less by the density of the liquid in the tank 13, as this varies the time for the drops to pass downwardly through the different layers. When the drops pass rapidly from the upper hot layer through the intermediate layer and into the cold layer they will not form well rounded balls. For spherical balls the density of the lower layer should be such as to retard materially the fall of the drops and even to cause them to move up and down slightly before plunging into the cooler layer. Partly for this reason the layer of liquid of intermediate temperature is desirable, as too material a variation in temperatures between the two other layers will cause the balls to flatten. Hence, it will be seen, that, in order to produce balls of substantially perfect sphericity it is necessary that means be provided in the apparatus for nicely adjusting the conditions of temperature and density.

One feature of the process is to cool the balls as uniformly as possible. This is sought for by keeping the temperature of each liquid zone as nearly uniform as possible. This is to prevent one portion of the surface of the balls from hardening before other portions.

The balls should be smooth and preferably spherical. If rough, air-bubbles are likely to adhere in the depressions and the surface more readily becomes soiled with substances of densities unlike that of the balls. To produce smooth spherical balls the balls should be cooled uniformly throughout. The tendency is to cool the lower side more rapidly than the remainder, and the outer portions more rapidly than the interior. To avoid this the aim is to keep the liquid in the intermediate zone of uniform temperature and to keep the balls in this zone as long as possible. As the intermediate zone is at substantially the same temperature as the solidifying temperature of the balls, by delaying the passage through this zone sufficiently long, the balls assume their solidifying temperature throughout during the passage, and if the temperature of the zone is sufficiently uniform throughout the upper portions will solidify substantially as soon as the lower portions.

The delay is produced by keeping the density of the liquid substantially the same as the balls. This also produces spherical balls, as substantially the only force acting on the plastic substance is that of surface tension or cohesion, and this tends always to produce spherical masses. And by keeping the upper and lower portions of the masses at substantially the same temperature smoother balls are produced. If the lower surface is cooled more rapidly than the upper surface a rigid lower crust is formed in which the upper portion contracts as it cools, leaving a depression or recess on the upper side. This sometimes is carried to such an extent that the depression closes on its upper surface, thereby enclosing more or less of the liquid within the surface of the ball. Such balls are worthless, and open depressions are objectionable.

One way of delaying the passage in the intermediate zone is to maintain as steep as possible the temperature gradient between the two lower zones. The cooler lower liquid is more dense than the upper liquid and also than the balls. As a consequence the balls are brought to rest and often move up and down on the upper surface of the lower zone until they become sufficiently cool and dense to sink in the lower liquid. This not only allows more time for the interior of the balls to cool, but it gives the lower surface a chance to warm up slightly when the balls rise in the liquid.

By careful control of the temperatures of the zones substantial uniformity of the temperature in each zone may be maintained and also the density may be kept suitable. This, however, requires almost constant attention and delicate control. By varying the degree of concentration of the solution or the nature of the solvent, the density may be controlled and the temperature control is simplified.

To make more specific the process of manufacture of balls I will describe in some detail the method of making Chaslyn balls having a specific gravity of 1.2 and a melting point of 170° F. The material for such balls is melted and poured into the reservoirs 8 and 5 while the outlets 28, hereinafter described, are closed and positioned somewhat above the coil 26 in the tank 13. Steam is passed through the various heating coils so as to raise the temperature to nearly 212° F.

The tank 13 and the tubes 20, 23 and 24 are filled with a solution of calcium chloride having a density of 1.06, and the tank 21 is filled with water at about 80° F. The outlets 28 are opened so that the drops of the melted substance are passed into the calcium chloride solution. The behavior of the drops in falling in the solution is noted and samples of the balls formed are removed from the bottom of the tank 13 through the tube 20. An examination of these balls indicates to one skilled in the art what adjustments of temperature and density of the calcium chloride solution are to be made in order to obtain balls of desired shape and size. For instance, if the sample balls are too large, hot calcium chloride solution having a density less than 1.06, or eventually hot water, is added through the tube 24; and, if the samples are not of the shape desired, the water in the tank 21 is drawn out through the cock 22 until its level is below the cock 25. This is then opened and the level of the calcium chloride lowered in the tank 13 somewhat. The cock 25 is then again closed and calcium chloride solution of a different density and temperature added through the tube 23 to restore the level and change the concentration and temperature of the intermediate layer.

The following gives complete data with reference to one run of these balls which was made in order to show definitely the operation throughout. This run has been taken and was as follows:

The horizontal lines $a$, $b$, $c$, and $d$, Fig. 1, indicate the levels of the calcium chloride solution within the container 13, and $x$, $y$ and $z$ show the levels of the water, in the tank 21, at which temperature readings were taken during the run.

The container 13 was filled with calcium chloride solution having a specific gravity of 1.14, and the tank 21 was filled to $x$ with water at 105° F. Steam was passed through the pipe 26 for about half an hour, the water in the tank 21 being stirred frequently. The level of the water was then lowered to $y$ and readings of temperature taken as follows: At $a$, 190° F., at $b$, 140° F., at $c$, 108° F., at $d$, 95° F., at $y$, 86° F.

A little boiling water was slowly introduced through the tube 24 so as to float on the top, and the melted material which was to be formed into pellets having a specific gravity of 1.28 was poured into the tank 8.

Balls fell rapidly from the nozzles 28 to a plane about halfway between $b$ and $c$ where they stopped and moved about one-fourth of an inch only to fall again very slowly at first but with increasing speed. As they reached $c$, their lower parts were seen to become lighter in color (due to solidification), the change in hue extending upwardly as the cooling balls sank lower and lower. At $d$, sprues started to form at the tops of the balls, when they fell at greater speeds with lengthening sprues.

More boiling water was gently poured through the tube 24 in order to weaken the calcium chloride solution at the top and thereby diminish the diameter of the balls, which was greater than desired.

After twenty minutes, the temperatures were: At $a$, 200° F., at $b$, 176° F., at $c$, 122° F., at $d$, 95° F., at $y$, 95° F.

At this time the balls were hardly moving up at all—just coming to a full stop for an instant and then behaving as described above. The level of this hesitation was at $c$ or a little below.

Twenty minutes afterwards the temperatures were: At $a$, 200° F., at $b$, 180° F., at $c$, 140° F., at $d$, 97° F., at $y$, 97° F.

Cold water was then added to the tank 21 to reduce the temperature to 80° F. The behavior of the balls were similar to that described last, although the level of hesitation was a bit lower.

After twenty minutes, the temperatures were: At $a$, 202° F., at $b$, 182° F., at $c$, 144° F., at $d$, 96° F., at $x$, 82° F.

Calcium chloride solution having a density of 1.3 and a temperature of about 90° was slowly introduced into container 13 through the tube 23. In a short time the balls began to move up and down a little at a level a trifle above $c$. A little boiling water was added through the tube 24 in order to again decrease the size of the balls. As the sprues were almost disappearing, the water in the tank 21 was partly run out through the petcock 22 and cold water added up to $z$, the temperature of the bath being reduced to 70°. The sprues soon reappeared although quite small.

After thirty minutes, the temperatures were: At $a$, 204° F., at $b$, 180° F., at $c$, 150° F., at $d$, 106° F., at $z$, 70° F.

Since the container 13 was now filled with balls, the run was stopped.

The tube 20 is constructed of two telescoping sections, the upper section 33 being provided with an overflow spout 34. By sliding these sections upon one another, the level of the liquid in the tank 13 may be controlled.

To further control the temperature of the liquid in the tank 13 the temperature of the liquid in the tank 21 may be varied, and the liquid elevation in the tank 21 may be maintained wherever desired, usually preferably in the neighborhood of the top of the cold layer of liquid in the tank 13. It will be understood that the temperature of the liquids in the various layers can be tested whenever desired by ordinary chemical thermometers or in any other manner.

The size of the balls depends upon the size of the drops which are produced and in order to vary the size of the drops I provide outlets 28 which can be screwed into the orifices 15, and the bore of the outlets may be of the desired size. In practice, especially with the smaller balls, the operation consists in forcing out a stream of the melted substance, so that the drops are not formed until after the liquid passes away from the outlet, a cylinder of the liquid being pressed out, and the liquid then forms independent drops after passing entirely away from the outlet, the cylinder continuously breaking up into drops. But whether or not the drops are formed in this manner the size will depend materially on the bore of the outlets 28, and the drops may form as the liquid leaves the outlet.

In order to control the operation it is desirable to provide means for closing these orifices. Any suitable means may be provided, but I prefer to provide a tube 29 which is inserted into the bearing 30, the tube having an opening 31 in its wall which may be made to register with an opening 32 in the bearing 30. Obviously the opening 32 may be closed by rotating the tube 29 away from registry of the openings, or the size of the openings 32 may be varied by rotating slightly the tube 29 from its fully open position. Similar results will be produced by moving the tube 29 upwardly or downwardly. If desired these tubes can be removed entirely from the reservoir for the purpose of cleaning or otherwise, or a wire may be inserted through the bore of the tube for cleaning purposes.

Although, for convenience, I have herein referred to balls and pellets, yet it should be understood that these are merely illustrative, and the description and claims herein have reference to small pieces or particles of the substances as well as to balls or pellets thereof.

I claim as my invention:

1. A method for making pellets or the like consisting in passing streams of the substance from which the pellets are to be made into a zone of liquid, the temperature of which is maintained constantly higher than the melting point of the substance, thus forming drops of the substance, in then passing the drops into a zone of liquid constantly kept at a lower temperature, and in finally passing the drops into a third zone of liquid, the temperature of which is maintained all the time still lower and is also lower than the melting point of the substance.

2. A method for making pellets as claimed in claim 1 consisting in allowing the pellets to sink freely a short distance in the zones referred to.

3. A method of making pellets consisting in causing drops of the melted substance of which the pellets are to be made to be formed in a layer of liquid, the temperature of which is constantly maintained above that of the melting point of the substance, and in causing the drops to move through said liquid into a second layer of liquid always kept colder, and in then causing the drops to move into a still colder layer of liquid, the temperature of which is constantly maintained below the melting point of the substance.

4. A method of making pellets consisting in causing drops of the substance of which the pellets are to made to be formed in the upper portion of a mass of liquid, the temperature of said upper portion being constantly maintained not less than the melting point of the substance, and in allowing the drops to move freely under the action of gravity to the bottom of said mass of liquid, and in always maintaining the lower layer of the liquid below the melting point of the substance, and in likewise maintaining an intermediate layer of the mass of said liquid at a temperature intermediate the temperatures of said upper and lower layers.

5. Apparatus for forming pellets comprising a vessel adapted to contain a liquid, means for maintaining constantly the temperatures of an upper, an intermediate, and a lower layer of said liquid, respectively, higher than, nearly the same as, and lower than the melting point of the substance from which the pellets are to be made, and means for passing drops of said substance into said upper layer of liquid, the density of the liquids being such as to allow the drops to pass downward through said layers.

6. Apparatus for forming pellets comprising a relatively deep vessel adapted to contain liquids, means for supplying miscible liquids of different densities and temperatures to said vessel, means for regulating both the temperatures and the densities of zones or layers of said liquids, the top layer being constantly maintained at a temperature considerably above the melting point of the substance to be formed into pellets and at a density less than that of the melted substance, the intermediate layer being maintained at a temperature and density nearly equal to that of the melted substance, and the bottom layer being kept at a temperature less than the melting point of said substance and at a density greater than that of the substance in the melted state but less than that it possesses when solidified.

7. Means for forming pellets comprising a relatively deep vessel containing a liquid, the temperature of the lower portion of which is maintained constantly uniform and below the melting point of the substance of which the pellets are to be made, the temperature of the upper portion of which is constantly maintained above the temperature of the melting point of the substance, and an intermediate layer of the liquid, the temperature of which is maintained uniform and at an intermediate temperature, and means for forming drops of the melted substance in the upper portion of the liquid.

8. Means for forming pellets as claimed in claim 7, in which said liquid is a salt solution.

9. Means for forming pellets as claimed in claim 7, in which said liquid is a solution of calcium chloride.

10. A method of forming pellets and the like, consisting in forming drops of the liquid from which the pellets are to be made in a liquid solution, the concentration of various portions of which is such as to provide a layer in the upper portion of the liquid which is constantly maintained less dense than the drops, to provide a layer in the lower portion of the liquid which is constantly maintained denser than the upper layer, and to provide an intermediate layer of liquid, the density of which is maintained constantly intermediate the density of the other two layers.

11. A method of forming pellets as set forth in claim 10 in which the temperatures of the layers of liquids vary inversely with the density thereof.

12. A method of making pellets or balls of a substance consisting in forming drops of the melted substance in a liquid, in letting the drops fall in the liquid retarded only by the buoyancy of the liquid, and in adjusting the buoyancy of an intermediate portion of the liquid so that the drops on reaching said portions stop and move up and down one or more times.

13. A method of making balls of a substance consisting in allowing drops of the melted substance to form and fall in an upper zone of a liquid possessing a temperature above the melting point of the substance and a buoyant force somewhat retarding the speed of fall of the drops, passing them into another zone of liquid with a temperature nearly equal to the melting point of the substance, and a buoyant force sufficient to slow up considerably the motion of the drops, and finally entering a third zone of liquid at a temperature below the melting point and having a buoyant force sufficient to stop the falling of the melted drops but not sufficient to prevent their fall on solidification.

In testimony whereof, I hereunto set my hand.

CHARLES E. LINEBARGER.